United States Patent Office 3,772,336
Patented Nov. 13, 1973

3,772,336
4H-[1]BENZOTHIENO[3,2-β]PYRAN-4-ONE-2-CAR-BOXYLIC ACIDS AND RELATED COMPOUNDS
John B. Wright, Kalamazoo, Mich., assignor to
The Upjohn Company, Kalamazoo, Mich.
No Drawing. Continuation-in-part of abandoned application Ser. No. 148,188, May 28, 1971. This application Apr. 25, 1972, Ser. No. 247,308
Int. Cl. C07d 63/22
U.S. Cl. 260—330.5                                    7 Claims

ABSTRACT OF THE DISCLOSURE

Compounds of Formula I, below, possess anti-anaphylactic properties and find use in the treatment of anaphylaxis and as anti-allergy agents, such as the treatment of allergic bronchial asthma.

REFERENCE TO RELATED APPLICATIONS

This application is a continuation-in-part of application Ser. No. 148,188, filed on May 28, 1971, and now abandoned.

BACKGROUND OF THE INVENTION

The field of invention relates to chemical compounds of the formula

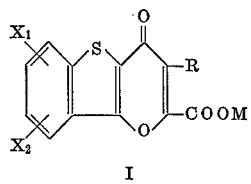

I where:

R=preferably H, but can be lower alkyl ($C_1$-$C_4$)
M=H, Na, K, Ca, lower alkyl ($C_1$-$C_4$), $NH_4^+$, tetraalkylammonium ion ($C_1$-$C_4$)
$X_1$=H, halogen (Cl, F) $CF_3$, $CH_3O$—, COOH, $NO_2$, $CH_3$
$X_2$=H, halogen (Cl, F) $CF_3$, $CH_3O$—, COOH, $NO_2$, $CH_3$ These compounds possess anti-allergic properties as measured by the in vivo rat passive cutaneous anaphylaxis (PCA) reaction.

Certain 4H - [1]benzothieno[3,2-b]pyran - 4-ones are known, e.g., Tetrahedron 21(4) 849 to 859 (1965), wherein the 2-position contains a variety of aryl substituents, but the 2-carboxylic acid compounds of this invention are novel.

The specific anti-allergy properties of the disodium salt of cromoglycic acid, i.e., 5,5'-(2-hydroxy-1,3-propanediyl-dioxy)-bis-(4-oxo-4H-1-benzopyran - 2 - carboxylic acid) are known (J.S.G. Cox et al., "Advances in Drug Research," vol. V, page 115. Academic Press, New York 1970).

SUMMARY OF THE INVENTION

The compounds of Formula I can be prepared according to the following reaction scheme:

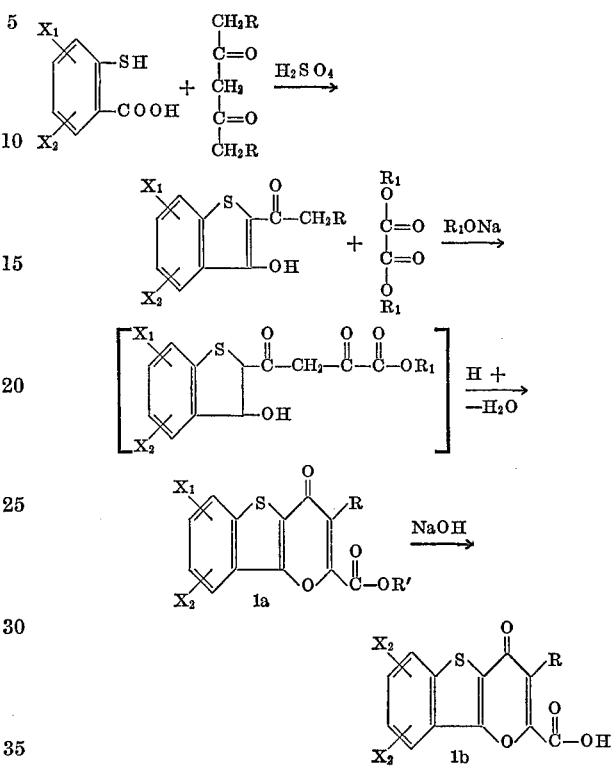

The starting o-mercaptobenzoic acid can be synthesized from the corresponding anthranilic acids by the following steps:

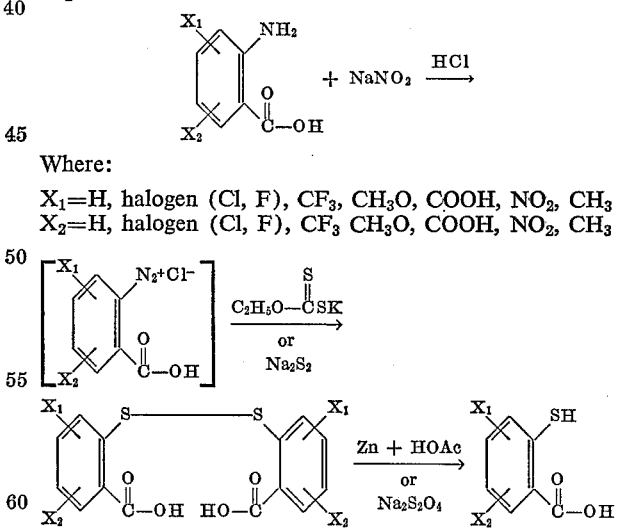

Where:

$X_1$=H, halogen (Cl, F), $CF_3$, $CH_3O$, COOH, $NO_2$, $CH_3$
$X_2$=H, halogen (Cl, F), $CF_3$ $CH_3O$, COOH, $NO_2$, $CH_3$ In the foregoing the values of R, $X_1$ and $X_2$ are as given above. $R_1$ is alkyl of the range $C_1$ to $C_4$.

The former reaction scheme follows the method of Smiles and McClelland, J. Chem. Soc. 1810 (1921). The latter reaction scheme follows the methods of Katz et al., J. Org. Chem. 18, 1380–1402 (1953) and Amoretti and Pagani, Farmaco, Ed. Sci., 22(11), 917–22 (1967); Chem. Abs. 68, 77913 (1968).

The salts described above, as indicated by the values of M in Formula I, can be prepared by known methods as by reaction of the corresponding free carboxyl compound, Ib above, with the appropriate base, as for example sodium, potassium, calcium or ammonium hydroxide, or quaternary alkyl ammonium base.

In the former reaction scheme, bases other than $R_1ONa$ can be used, e.g., $R_1OK$ or $(CH_3)_3COK$.

In the cyclization step to form compound Ia above, various acidic agencies can be used to provide the hydrogen ion concentration, e.g., aqueous HCl, aqueous HBr, dilute $H_2SO_4$, anhydrous HF, polyphosphoric acid, $H_3PO_4$, p-toluenesulfonic acid, acidic resins (e.g., Dowex 50) and the like. The cyclization step can also be carried out by means of heat, e.g., employing temperatures in the range of 100° to 200° C.

The cyclization reaction is usually carried out in the presence of an organic solvent in which the reactants are soluble (e.g., ethanol, methanol, dioxane, methyl cellosolve, tetrahydrofuran, etc.).

The compounds of this invention can be administered by inhalation of an aerosol or powder (i.e., by breathing finely-divided particles of the active agent into the lungs), orally, rectally or by injection.

The novel compounds of this invention, i.e., compounds of Formula I, including the salts thereof, are useful as anti-asthmatic, anti-allergy and antihypertensive agents, in the treatment of mammals, including man. For those purposes said novel compounds can be used in the protonated (free acid) form or in the ester or salt form either in association with a pharmaceutical carrier in solid or liquid dosage forms, such as tablets, capsules, suspensions, aerosols, powders, pills, granules, syrups, elixirs, suppositories, sterile aqueous or vegetable oil dispersions for parenteral use, and the like, alone or in combination with other drugs, for example, in combination with bronchodilators, steroids, antihistamines and others.

Powders are prepared by comminuting the active ingredient to a suitable fine size and mixing with a similarly comminuted diluent. The diluent can be an edible carbohydrate material such as starch, or lactose. Advantageously, a sweetening agent is present as well as a flavoring agent.

Capsules are produced by preparing a powder mixture as hereinbefore described and filling into formed gelatin sheets. Advantageously, as an adjuvant to the filling operation, a lubricant such as talc, magnesium stearate and calcium stearate is added to the powder mixture before the filling operation.

Tablets are made by preparing a powder mixture, granulating or sludging, adding a lubricant and pressing into tablets. The powder mixture is prepared by mixing the active ingredient suitably comminuted, with a diluent or base such as starch, lactose, kaolin, dicalcium phosphate, calcium sulfate, and the like. The powder mixture can be granulated by wetting with a binder such as syrup, gelatin solution, methylcellulose solution or acacia mucilage and forming through a screen. As an alternative to wet granulating, the powder mixture can be slugged, i.e., run through a tablet machine and the resulting large tablets broken down into granules. The granules are further lubricated to prevent sticking to the tablet-forming dies by means of the addition of stearic acid, a stearate salt, talc, or mineral oil. The lubricated mixture is then compressed into tablets.

Advantageously, the tablet can be provided with a protective coating consisting of a sealing coat of shellac, a coating of sugar and methylcellulose, and a polish coating of carnauba wax.

Oral fluids are prepared in unit dosage forms such as syrups and elixirs wherein each teaspoonful of composition contains a predetermined amount of active ingredient for administration.

A syrup is prepared by dispersing the active ingredient in a suitably flavored aqueous sucrose solution. Similarly an elixir is prepared utilizing an aqueous-alcoholic vehicle. Elixirs are advantageous vehicles for use when a therapeutic agent, which is not sufficiently water-soluble, is in the composition.

Suspension can be prepared with a syrup vehicle with the aid of a suspending agent such as acacia, tragacanth, methylcellulose and the like.

For parenteral administration aqueous fluid unit dosage forms can be prepared. In preparing the parenteral form, a measured amount of active ingredient is placed in a vial, and the vial and its contents are sterilized and sealed. An accompanying vial of sterile water for injection is provided as a vehicle to form a dispersion prior to administration. Advantageously, the sterile water can have dissolved therein a local anesthetic and buffering agent. Parenteral aqueous solutions can also be made by utilizing a pharmacologically acceptable salt of the active ingredient, such as those mentioned above.

Alternatively, a parenteral preparation can be prepared by dispersing the active ingredient in a parenterally acceptable vegetable oil with or without additional adjuvants, and sterilizing after filling into vials.

For veterinary oral use the active ingredient is conveniently prepared in the form of a food premix. The food premix can comprise the active ingredient in admixture with an edible pharmaceutical diluent such as starch, oatmeal, flour, calcium carbonate, talc, dried fish meal, and the like. The prepared premix is then conveniently added to the regular feed, thereby providing medication to the animal in the course of feeding.

The term "unit dosage form" as used in the specification and claims refers to physically discrete units suitable as unitary dosages for human subjects and animals, each unit containing a predetermined quantity of active material calculated to produce the desired therapeutic effect in association with the required pharmaceutical diluent, carrier or vehicle. The specifications for the novel unit dosage forms of this invention are dictated by and directly dependent on (a) the unique characteristics of the active material and the particular therapeutic effect to be achieved, and (b) the limitations inherent in the art of compounding such active material for therapeutic use in humans and animals, as disclosed in detail in the specification, these being features of the present invention. Examples of suitable unit dosage forms in accord with this invention are tablets, capsules, pills, powder packets, drops, aerosols, sprays, granules, wafers, cachets, suppositories, segregated multiples of any of the foregoing, and other forms as herein described.

The amount of active ingredient that is to be administered depends on the age, weight of the patient, the particular condition to be treated, the frequency of administration, and the route of administration. The dose range is from about 0.02 to about 20 mg. per kg. of body weight, preferably about 0.1 to about 10 mg. per kg. of body weight. The human dose ranges from about 5 to about 500 mg. daily given as a single dose or in 3 or 4 divided doses; preferably, the adult single dose is from 5 to about 50 mg. parenterally or by inhalation. Veterinary dosages will correspond to human dosages with amounts administered being in proportion to the weight of the animal as compared to adult humans.

The active ingredient is compounded with a suitable pharmaceutical diluent in unit dosage form, either alone or in combination with other active ingredients. The amount of such other active ingredients is to be determined with reference to the usual dosage of each such ingredient. Thus the novel compounds of the invention can be combined with bronchodilators such as isoproterenol 1-20 mg., ephedrine 25-50 mg., steroids, such as methylprednisolone 1-5 mg.

Antiallergy, anti-asthma effects of 4-oxo-4H-[1]benzothieno[3,2-b]pyran-2-carboxylic acid is shown by the following in vivo test in rats.

Rat homocytotropic antibody was elicited to egg albumin (EA) by the injection of 0.5 mg. EA+0.5 cc. *H. pertussis* vaccine per rat. After 25-30 days the serum was collected and frozen until use. The antibody was shown to be of the 72 hr. latency, heat labile type. 0.1 ml. of an appropriate dilution of this serum was inoculated into the shaved dorsal surface of a 200 gm. SD rat. Saline controls were run also. After 27 hours the rat was challenged IV (intravenously) with 4 mg. EA+0.5% Evans blue dye. In the case of drug treated animals the materials were given IV at the time of antigen challenge or the materials were given IP intraperitoneally 30 min. before challenge with antigen. Results were reported as the number of spots per animal (regardless of size) that are seen at 3 dilutions of serum. The control spots are compared to drug treated spots and a spot score is obtained (number of total spots divided by the number of animals). The percent inhibition of the PCA reaction is then calculated.

RESULTS

| IV dose mg./kg.: | Percent inhibition |
|---|---|
| 50 | 75 |
| 10 | 75 |
| 5 | 33 |
| 2.5 | 25 |

The test compound protects rats against death due to horse serum induced anaphylaxis. At a dose of 15 mg./kg., 80% of the test rats were protected for 14 hours or more.

The test compound also has antiinflammary activity as indicated by the Erythrocyte Sedimentation rate test. The test is carried out as follows:

Blood is collected in heparinized syringes from the dorsal aorta of anesthetized Carworth male rats, weighing more than 300 g. Bloods are centrifuged at high speeds and plasmas discarded and red cells washed once with equal volumes of saline, after which they are diluted to 50% v./v. with saline. One milliliter of dextran or some other accelerator of red cell settling is added to 1 ml. of red cell suspension, making a final concentration of 25% RBC and 1% dextran.

The candidate compound is made up in isosmotic NA₂PO₄ buffer (pH 7.0) to which the same amount of dextran is added. Tubes, in duplicate or triplicate, are allowed to stand at room temperature for 30 min., mixed and transferred by capillary pipettes to Wintrobe Dispo-Type hematocrit tubes. The ESR is recorded at 60 min. For routine assays, and whenever possible, the rate of red cell settlings in control hematocrit tubes is adjusted to attain a rate of 60-70 mm./hour. Washed rat red cells alone do not display a tendency to fall when allowed to stand in hematocrit tubes for 24-48 hr.

The pharmaceutical forms contemplated by this invention include pharmaceutical compositions suited for oral, nasal, parenteral and rectal use, e.g., tablets, powder packets, cachets, dragées, capsules, solutions, suspensions, sterile injectable forms, suppositories, bougies, inhalation, insufflation and the like. Suitable diluents or carriers such as carbohydrates (lactose), proteins, lipids, calcium phosphate, cornstarch, stearic acid, methylcellulose and the like may be used as carriers or for coating purposes. Oil, e.g., coconut oil, sesame oil, safflower oil, cottonseed oil, peanut oil may be used for preparing solutions or suspensions of the active drug. Sweetening, coloring and flavoring agents may be used.

As anti-allergy and anti-asthma the compounds of Formula I can be used in dosages of 0.02-20 mg./kg. in aerosols, powders for insufflation, oral, intranasal or injectable preparations as described above, to improve breathing and allergic reactions in mammals, preferably by aerosol or insufflation of a powder.

DESCRIPTION OF THE PREFERRED EMBODIMENTS

Example 1.—Ethyl 4H-[1]benzothieno[3,2-b]pyran-4-one-2-carboxylate

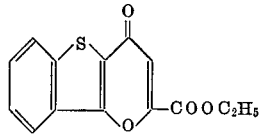

To a stirred solution of 19.32 g. (0.825 moles) of sodium in 2 liters of anhydrous ethanol was added 57.6 g. (0.3 moles) of 2-acetyl-3-hydroxybenzothiophene [S. Smiles and L. W. McClelland, J. Chem. Soc. 119, 1810 (1921)] and then, dropwise over the course of about 5 minutes, 120.3 g. (0.825 moles) of diethyloxalate. The mixture was heated under reflux for 15 hours, was allowed to cool to room temperature overnight, and the red solid was removed by filtration. The solid was added to a mixture of 360 ml. of ethanol and 88.5 ml. of conc. hydrochloric acid and the resulting mixture was heated under reflux for 30 minutes and filtered hot. The insoluble material was extracted twice with 350 ml. of hot ethanol.

The ethanolic filtrates were combined and allowed to cool. The precipitate was removed by filtration. There was obtained 51.3 g. of material melting at 152-3°.

Additional material was obtained by dissolving the hot ethanolic insoluble material in water and extracting the mixture with methylene chloride. Evaporation of the methylene chloride gave 6.85 g. of material melting at 158-9° C. The total yield of crude product was 58.15 g. (71%).

This material was purified further by dissolving in a 1:1 benzene-ether mixture and extracting the resulting solution with dilute sodium bicarbonate solution and then with water. The solvent was removed by distillation and the residue was recrystallized from ethanol. There were obtained green flat prisms melting at 158-9°; I.R. Spectrum (mull) 1725 (C=O), NMR (D₃OSCD₃) δ 1.48 (t, 3, CH₃), 4.48 (Q, 2, CH₂), δ 7.03 (s, 1, CH=C) and 7.50-8.30 (m, 4, aryl H); λ_max. (CH₂Cl₂) 237 (21,600), 251 (17,400), 259 (13,800), 280 sh. (8650), 291 (13,900), 301 (13,300) 335 (6980) mµ.

*Analysis.*—Calcd. for C₁₄H₁₀SO₄ (percent): C, 61.30; H, 3.67; S, 11.69. Found (percent): C, 61.08; H, 3.67; S, 11.69.

Example 2.—4H-[1]benzothieno[3,2-b]pyran-4-one-2-carboxylic acid

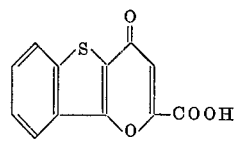

A mixture of 44.1 g. (0.162 moles) of ethyl 4H-[1]-benzothieno[3,2-b]pyran-4-one-2-carboxylate and 650 ml. of 1% sodium hydroxide solution (0.162 moles) was stirred at room temperature for 30 minutes. The mixture was extracted twice with 500 ml. portions of methylene chloride (to remove unreacted ester). Evaporation of the methylene chloride gave 2.70 g. of material melting at 155-8°. The aqueous layer was acidified with conc. hydrochloric acid and the precipitate was removed by filtration. There was obtained 35.2 g. (100%, based on ester not recovered) of material melting at 257° (dec.).

A one gm. sample was purified by recrystallization from 300 ml. of ethanol. There were obtained golden brown prisms melting at 267° (dec.) after darkening at about 253°; in spectrum. (Mull 2540, 2440

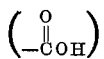

1725 (C=O) cm.⁻¹ NMR Spectrum [DCON(CD₃)₂], 7.1 S 1H, CH=C) 7.5 to 8.3 (m, 4H, Aromatic H), $\lambda_{max.}$ (DMF): 291 (14,000), 312 (6450) and 325 (7000) mμ.

*Analysis.*—Calcd. for $C_{12}H_6SO_4$ (percent): C, 58.53; H, 2.46; S, 13.02. Found (percent): C, 58.13; H, 3.02; S, 12.27.

Example 3.—2 acetyl-5-chloro-3-hydroxybenzothiophene

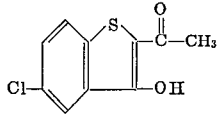

Treatment of 5-chloro-2-mercaptobenzoic acid [L. Katz et al., J. Org. Chem. 18, 1380–1402 (1953)] with 2,4-pentanedione in the presence of sulphuric acid according to the general procedure of Smiles and McClelland [J. Chem. Soc. 119, 1810 (1921)] gave 2-acetyl-5-chloro 3-hydroxybenzothiophene.

Example 4.—2-acetyl-6-chloro-3-hydroxy benzothiophene

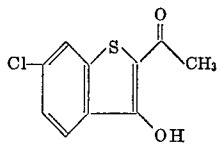

Treatment of 4-chloro-2-mercapto benzoic acid [L. Katz et al., J. Org. Chem. 18, 1380–1402 (1953)] according to the procedure of Example 3 gave 2-acetyl-6-chloro-3-hydroxy benzothiophene.

Example 5.—2-acetyl-5,7-dichloro-3-hydroxybenzothiophene

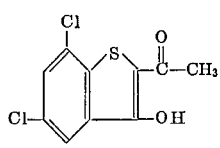

Treatment of 3,5-dichloro-2-mercaptobenzoic acid [L. Katz et al., J. Org. Chem. 18, 1380–1402 (1953)] with 2,4-pentanedione in the presence of sulphuric acid according to the general procedure of Smiles and McClelland [J. Chem. Soc. 119, 1810 (1921)] gave 2-acetyl-5,7-dichloro-3-hydroxybenzothiophene.

Treatment of 5-methyl-2-mercaptobenzoic acid, S. Krishna et al., J. Indian Chem. Soc. 4, 291–6 (1927), with 2,4-pentanedione in the presence of sulfuric acid as in Example 3, produces 2-acetyl, 5-methyl-3-hydroxybenzothiophene.

Treatment of 5-fluoro-2-mercaptobenzoic acid with 2,4-pentanedione in the presence of sulfuric acid as in Example 3, produces 2-acetyl-5-fluoro-3-hydroxybenzothiophene.

Treatment of 4-methyl-2-mercaptobenzoic acid (D.R.P. 216, 269) with 2,4-pentanedione in the presence of sulfuric acid as in Example 3, produces 2-acetyl-6-methyl-3-hydroxybenzothiophene.

Treatment of 4-fluoro-2-mercaptobenzoic acid with 2,4-pentanedione in the presence of sulfuric acid as in Example 3, produces 2-acetyl-6-fluoro-3-hydroxybenzothiophene.

Substitution of 2-acetyl-5-chloro-3-hydroxybenzothiophene, 2-acetyl-6-chloro-3-hydroxybenzothiophene and 2-acetyl-5,7- dichloro-3-hydroxybenzothiophene in the procedure of Example 1 produces, respectively, ethyl 7-chloro-4H-[1]benzothieno[3,2 - b]pyran - 3 - one-2-carboxylate, ethyl 6-chloro-4H-[1]benzothieno[3,2-b]pyran-4-one-2-carboxylate and ethyl 5,7-dichloro-4H-[1]benzothieno[3,2-b]pyran-4-one-2-carboxylate.

Substitution of 2-acetyl-5-fluoro-3-hydroxybenzothiophene, and 2-acetyl-6-fluoro-3-hydroxybenzothiophene in the procedure of Example 1 produces, respectively, ethyl 7-fluoro-4H-[1]benzothieno[3,2-b]pyran - 4 - one-2-carboxylate, ethyl 6-fluoro-4H-[1]benzothieno[3,2-b]pyran-4-one-2-carboxylate.

Substitution of 2-acetyl-5-methyl-3-hydroxybenzothiophene, 2-acetyl-6-methyl-3-hydroxybenzothiophene in the procedure of Example 1 produces, respectively, ethyl 7-methyl-4H-[1]benzothieno[3,2-b]pyran - 4 - one-2-carboxylate, and ethyl-6-methyl-4H-[1]benzothieno[3,2-b] pyran-4-one-2-carboxylate.

Substitution of dipropyl oxalate, dibutyl oxalate and dimethyloxalate for diethyloxalate in the procedure for Example 1 produces, respectively, the propyl, butyl and methyl esters of 4H-[1]benzothieno[3,2-b]pyran-4-one 2-carboxylic acid.

The foregoing esters can be hydrolyzed by the process of Example 2, producing, 7-chloro-4H-[1]benzothieno[3,2-b]pyran-4-one-2-carboxylic acid, 6-chloro-4H-[1]benzothieno[3,2-b]pyran-4-one-2-carboxylic acid, 5,7-dichloro-4H-[1]benzothieno[3,2-b]pyran-4-one - 2 - carboxylic acid, 7-fluoro-4H-[1]benzothieno[3,2-b]pyran-4-one-2-carboxylic acid, 6-fluoro-4H-[1]benzothieno[3,2-b]pyran-4-one-2-carboxylic acid, 7-methyl-4H-[1]benzothieno[3,2-b]pyran-4-one-2-carboxylic acid, and 6-methyl-4H-[1]benzothieno[3,2-b]pyran-4-one-2-carboxylic acid.

Example 6.—Sodium-4H-[1]benzothieno[3,2-b]pyran-4-one-2-carboxylate

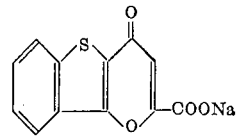

The product obtained in Example 2 was dissolved in water containing an equivalent amount of sodium bicarbonate. The resulting solution was filtered, the filtrate was frozen and the water removed under freeze-dried conditions.

Substitution of potassium bicarbonate, calcium hydroxide, magnesium carbonate in the process of Example 6 produces, respectively, the potassium, calcium and magnesium salts of 4H-[1]benzothieno[3,2-b]pyran-4-one-2-carboxylic acid.

Substitution of 7-chloro-4H-[1]benzothieno[3,2 - b]pyran-4-one-2-carboxylic acid, 6-chloro-4H-[1]benzothieno[3,2-b]pyran-4-one-2-carboxylic acid, 5,7-dichloro-4H-[1]benzothieno[3,2-b]pyran-4-one-2-carboxylic acid, 7-fluoro-4H-[1]benzothieno[3,2-b]pyran - 4 - one-2-carboxylic acid, 6-fluoro-4H-[1]benzothieno[3,2-b]pyran-4-one-2-carboxylic acid, 7-methyl-4H-[1]benzothieno[3,2-b]pyran-4-one-2-carboxylic acid, and 6-methyl-4H-[1]benzothieno[3,2-b]pyran-4-one-2-carboxylic acid, in the process of Example 6 produces the corresponding sodium salts of each compound.

The novel compositions of the present invention represented by Formula I that are administered by inhalation as a fog or mist can be prepared and containers filled with them by the procedure that follows.

A suitable measured quantity of a medicament embraced by Formula I is mixed with, and dissolved in, a measured amount of co-solvent (e.g., ethanol, diethyl ether, etc.).

A measured quantity of the resulting solution is then introduced into an open container, which is then cooled to a temperature below the boiling point of the non-toxic propellant to be employed, a temperature of about —32° C. being satisfactory. A measured quantity of the liquefied propellant (e.g., dichlorodifluoromethane, dichlorotetrafluoroethane, etc.), cooled below its boiling point, is then introduced into the container and mixed with the solution already present. The quantities of the compounds introduced into the container are calculated to provide the desired concentration of each in the final composition. Without permitting the temperature of the container and its contents to rise above the boiling point of the propellant the container is sealed with a closure equipped with a suitable dispensing valve arrangement. Upon warming to room temperature, the contents of the container is mixed by agitation to insure complete solution of the medicament; the sealed container is then ready to dispense the composition and provide the medicament of Formula I in aerosol form.

It is desirable to enclose the compositions of Formula I in a pressure-tight container having a suitable outlet valve secured in an opening in the top wall of the container. Glass bottles can be substituted for metal containers, thereby making it possible to readily observe the amount of medicament remaining therein. The glass bottle can be coated with a clear plastic film as a safety measure. A dip-tube of suitable material can be connected with the opening containing the valve arrangement and extending to the bottom of the container, or an inverted system without a dip-tube can be employed. Upon opening the valve, the composition is expelled through the opening in the form of a fine stream to form an aerosol of the medicament of Formula I. To accomplish suitable aerosolization of the medicament, the opening is preferably constructed to provide a small orifice so as to expel a fine spray (e.g., a fog or mist) of the composition. The thus described container is typical of the class known as an "aerosol" (bomb).

I claim:
1. A compound of the formula:

[structure with $X_1$, $X_2$, S, O, R, COOM]

where:

R = a member of the group consisting of hydrogen and lower alkyl ($C_1$-$C_4$)

M = H, Na, K, Ca, lower alkyl ($C_1$-$C_4$), $NH^{4+}$, tetraalkyl ammonium ion ($C_1$-$C_4$)

$X_1$ = H, Cl, F, $CF_3$, $CH_3O-$, COOH, $NO_2$, $CH_3$ $X_2$ = H, Cl, F, $CF_3$, $CH_3O-$, COOH, $NO_2$, $CH_3$

2. A compound according to claim 1 wherein $X_1$ is H, $X_2$ is H, R is H and M is H, and the corresponding sodium salts thereof.

3. A compound according to claim 1 wherein X is H, $X_2$ is $CH_3$, R is H and M is H; and the corresponding sodium salts thereof.

4. A compound according to claim 1 wherein $X_1$ is H, $X_2$ is halogen, R is H and M is H; and the corresponding sodium salts thereof.

5. Ethyl 4H - [1]benzothieno[3,2-b]pyran-4-one-2-carboxylate, in accordance with claim 1.

6. 4H - [1]benzothieno[3,2-b]pyran-4-one-2-carboxylic acid, in accordance with claim 1.

7. Sodium 4H - [1]benzothieno[3,2-b]pyran-4-one-2-carboxylate, in accordance with claim 1.

References Cited
UNITED STATES PATENTS
3,499,894   3/1970   Bockstahler -------- 260—247.1

HENRY R. JILES, Primary Examiner

C. JAISLE, Assistant Examiner

U.S. Cl. X.R.

424—275

UNITED STATES PATENT OFFICE
CERTIFICATE OF CORRECTION

Patent No. 3,772,336   Dated November 13, 1973

Inventor(s) John B. Wright

It is certified that error appears in the above-identified patent and that said Letters Patent are hereby corrected as shown below:

Column 2, lines 18-23 should appear as shown below instead of as in the patent:

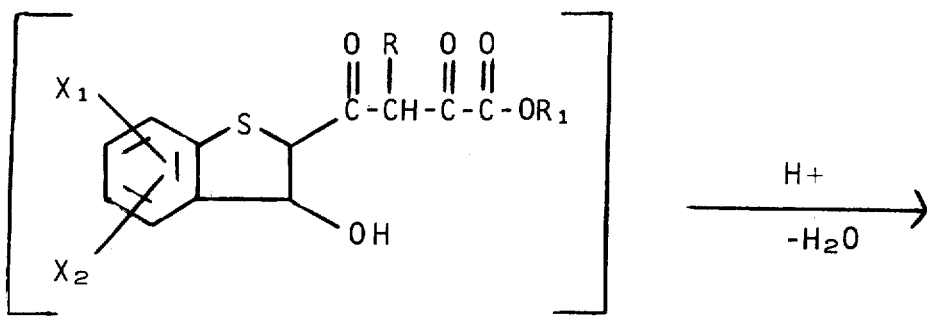

Signed and sealed this 9th day of July 1974.

(SEAL)
Attest:

McCOY M. GIBSON, JR.
Attesting Officer

C. MARSHALL DANN
Commissioner of Patents